US008232898B2

(12) United States Patent
Bai et al.

(10) Patent No.: US 8,232,898 B2
(45) Date of Patent: Jul. 31, 2012

(54) E85 GAS STATION LOCATOR APPLICATIONS USING V2X PEER-TO-PEER SOCIAL NETWORKING

(75) Inventors: Fan Bai, Ann Arbor, MI (US); Donald K. Grimm, Utica, MI (US); Anthony G. Lobaza, Bloomfield Hills, MI (US); Jeremy Bos, Houghton, MI (US); Michael J. Quinn, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 745 days.

(21) Appl. No.: 12/415,774

(22) Filed: Mar. 31, 2009

(65) Prior Publication Data

US 2010/0245124 A1 Sep. 30, 2010

(51) Int. Cl.
*G08B 21/00* (2006.01)
(52) U.S. Cl. .............. 340/991; 340/995.12; 340/995.13; 340/995.24; 340/995.19; 455/41.3; 342/357.22; 342/357.64
(58) Field of Classification Search ............... 340/10.52, 340/995.19, 991, 995.12, 995.13, 995.24; 455/41.3; 701/200, 209; 342/357.22, 357.64
See application file for complete search history.

(56) References Cited

U.S. PATENT DOCUMENTS 7,277,028 B1 * 10/2007 Janke ........................... 340/905
2003/0102997 A1 * 6/2003 Levin et al. ..................... 342/57
2004/0230370 A1 * 11/2004 Tzamaloukas ................ 701/200
2007/0005609 A1 * 1/2007 Breed ............................. 707/10
2009/0157289 A1 * 6/2009 Graessley ..................... 701/123

OTHER PUBLICATIONS

Baldessari, Roberto et al. Car 2 Car Communication Consortium Manifesto, Overview of the C2C-CC system. Version 1.1 Aug. 28, 2007.

* cited by examiner

*Primary Examiner* — Jennifer Mehmood
*Assistant Examiner* — Mark Rushing
(74) *Attorney, Agent, or Firm* — John A. Miller; Miller IP Group, PLC

(57) ABSTRACT

A system and method for wirelessly exchanging information concerning the location of E85 gas stations between E85 vehicles. The method includes transmitting messages from an E85 gas station that identifies the location of the E85 gas station, the time of the transmission and the price of the E85 gas, and receiving the messages by E85 vehicles that pass within a certain distance of the E85 gas station. The method also includes identifying that two E85 vehicles pass close to each other, where the vehicles periodically broadcast an E85 beacon identifying them as E85 vehicles. When two E85 vehicles are identified, the vehicles exchange information concerning a list of the E85 gas stations that they have stored from messages received from E85 gas stations and/or other E85 vehicles. The two vehicles update their lists to include those E85 gas stations that one vehicle may have that the other does not.

20 Claims, 2 Drawing Sheets

US 8,232,898 B2

E85 GAS STATION LOCATOR APPLICATIONS USING V2X PEER-TO-PEER SOCIAL NETWORKING

BACKGROUND OF THE INVENTION

1. Field of the Invention

This invention relates generally to a system and method for exchanging the location of E85 gas stations between vehicles and, more particularly, to a system and method for exchanging the location and other information concerning E85 gas station between vehicles using a short range wireless communications system, such as a DSRC communications system.

2. Discussion of the Related Art

Traffic accidents and roadway congestion are significant problems for vehicle travel. Vehicular ad-hoc network (VANET) based active safety and driver assistance systems are known that allow a vehicle communications system to transmit messages to other vehicles in a particular area with warning messages about dangerous road conditions, driving events, accidents, etc. In these systems, multi-hop geocast routing protocols, known to those skilled in the art, are commonly used to extend the reachability of the warning messages, i.e., to deliver active messages to vehicles that may be a few kilometers away from the road condition, as a one-time multi-hop transmission process. In other words, an initial message advising drivers of a potential hazardous road condition is transmitted from vehicle to vehicle using the geocast routing protocol so that vehicles a significant distance away will receive the messages because one vehicle's transmission range is typically relatively short.

Vehicular ad-hoc network based active safety and driver assistance systems allow a wireless vehicle communications system, such as a dedicated short range communication (DSRC) system, known to those skilled in the art, to transmit messages to other vehicles in a particular area with warning messages about driving conditions. In these systems, multi-hop geocast routing protocols, known to those skilled in the art, are commonly used to extend the reachability of the warning messages, i.e., to deliver active messages to vehicles that may be a few kilometers away, as a one-time multi-hop transmission process. In other words, an initial message advising drivers of a certain situation is transmitted from vehicle to vehicle using the geocast routing protocol so that relevant vehicles a significant distance away will receive the messages where one vehicle's direct transmission range is typically relatively short.

Vehicle-to-vehicle (V2V) and vehicle-to-infrastructure (V2X) applications require a minimum of one entity to send information to another entity. For example, many vehicle-to-vehicle safety applications can be executed on one vehicle by simply receiving broadcast messages from a neighboring vehicle. These messages are not directed to any specific vehicle, but are meant to be shared with a vehicle population to support the safety application. In these types of applications where collision avoidance is desirable, as two or more vehicles talk to each other and a collision becomes probable, the vehicle systems can warn the vehicle drivers, or possibly take evasive action for the driver, such as applying the brakes. Likewise, traffic control units can observe the broadcast of information and generate statistics on traffic flow through a given intersection or roadway.

The vehicle ad-hoc network communication systems discussed above have almost exclusively been used for safety applications. However, those systems can be extended to other applications, including non-safety applications.

Some vehicles are able to be driven on unleaded gasoline as well as a gasoline/alcohol mixture known in the industry as E85 fuel. Using E85 fuel is desirable for certain consumers because it provides another source of fuel besides gasoline. However, because of various reasons, such as not understanding E85 technology, not knowing what E85 is, not knowing whether a particular vehicle is E85-enabled, not knowing the location of E85 fuel stations, etc., E85 fuel has not caught on significantly with consumers. These reasons include that customers are not aware of the availability and location of gas stations that provide E85 fuel. Particularly, only a few gas stations provide E85 fuel and those gas stations change regularly where sometimes they will provide the E85 fuel and other time they won't. Thus, in order to make consumers more aware and knowledgeable about E85 gas stations, it may be desirable to provide a wireless communication and information processing system and method that allows for the exchange of information about E85 gas stations among the vehicles that are capable of consuming E85 fuel.

SUMMARY OF THE INVENTION

In accordance with the teachings of the present invention, a system and method are disclosed for wirelessly exchanging information concerning the location of E85 gas stations between E85 vehicles. The method includes transmitting messages from an E85 gas station that identifies the location of the E85 gas station, the time of the transmission and the price of the E85 gas, and receiving the messages by E85 vehicles that pass within a certain distance of the E85 gas station. The method also includes identifying that two E85 vehicles pass close to each other, where the vehicles periodically broadcast an E85 beacon identifying them as E85 vehicles. When two E85 vehicles are identified, the vehicles exchange information concerning a list of the E85 gas stations that they have stored from messages received from E85 gas stations and/or other E85 vehicles. The two vehicles update their lists to include those E85 gas stations that one vehicle may have that the other does not. In addition, the vehicle with stale information about E85 gas prices for a particular E85 gas station gets fresh updated information from another vehicle with the latest E85 gas prices for that E85 gas station.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for exchanging information between vehicles concerning the location of E85 gas stations is merely exemplary in nature, and is in no way intended to limit the invention or its applications or uses. For example, the present invention has particular application for exchanging information concerning E85 gas stations. However, as will be appreciated by those skilled in the art, the invention has application for exchanging other specialty information, such as fuel cell hydrogen stations, electric car charging stations, etc.

Figure 1:
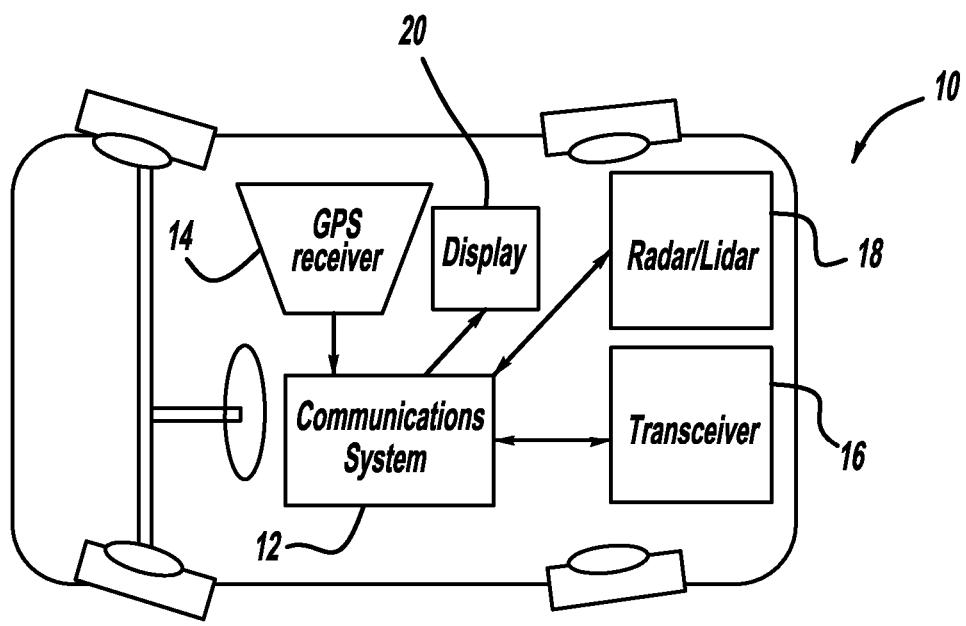
FIG. 1 is a plan view of a vehicle including a DSRC communications system.

FIG. 1 is a representation of a vehicle 10 that includes a communications system 12, a GPS receiver 14, a transceiver 16, a lidar, radar, vision and/or other sensing devices 18 and a display 20 that may be used in a vehicular ad-hoc communications network for chatting purposes, as discussed herein. The communications system 12 can be any suitable wireless vehicle communication system for the purposes discussed herein, such as the known DSRC system.

Figure 2:
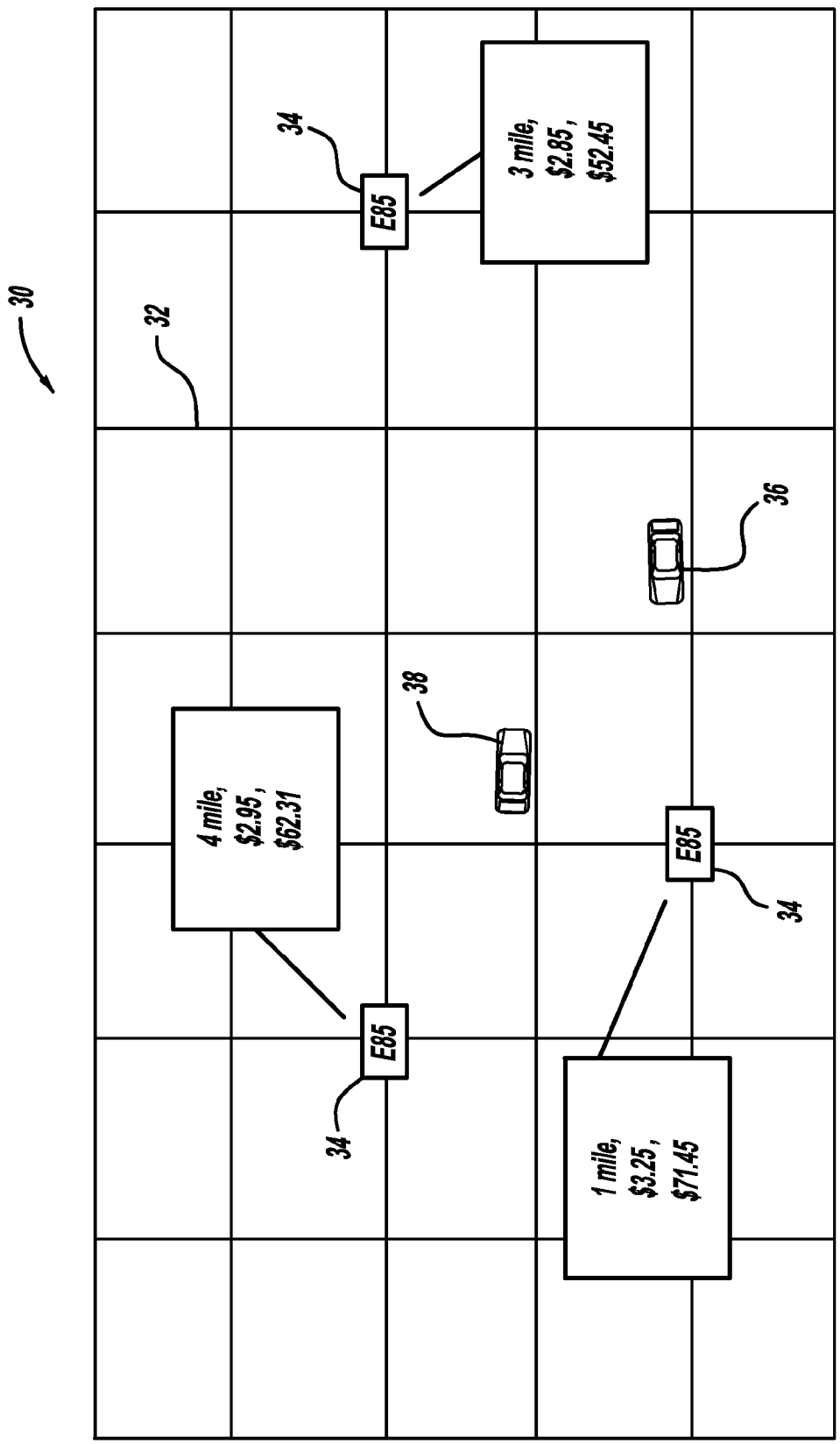
FIG. 2 is a roadway grid showing the location of vehicles and E85 gas stations.

FIG. 2 is an illustration of a grid 30 of roadways 32 showing the location of E85 gas stations 34. Each E85 gas station 34 will include a DSRC transmitter that transmits information within a predetermined range to be received by a vehicle 36 in the area. If the vehicle 36 has a DSRC communications system, and is an E85 vehicle, it will store the information about the E85 gas station, including its location, the time it received the information, price per gallon, etc. FIG. 2 illustrates the distance from the vehicle 36 to each E85 gas station 34, the current price per gallon and how much it would cost the vehicle owner to fill up its gas tank at its current tank capacity.

Each vehicle that is an E85 vehicle may store a list of information about an E85 gas station, such as shown in Table 1, including the gas station ID number, its location, the time stamp of when the information was generated, the price of the gas at that time and possibly a coupon. Therefore, when the vehicle driver of the vehicle 36 wants to refuel, the driver can display the locations of the E85 gas stations 34 within a certain range from its current location based on the information that it has received from the E85 gas stations it has passed, where the information will include the price per gallon at the particular time that it received the information and the cost for filling up the tank at the current tank capacity.

TABLE 1

Gas Station ID #
Location
Time Stamp
Gas Price
Coupon

Additionally, E85 vehicles can exchange their E85 gas station lists between them as they are passing on the roadway 32 so that the E85 vehicle 36 has a more complete location of the E85 gas stations 34 over a wider area. The E85 vehicle 36 will periodically transmit a identification beacon that identifies the vehicle 36 as an E85 vehicle, which may be received by other E85 vehicles within the range of the beacon. When two E85 vehicles, such as vehicles 36 and 38, pass each other and identify to each other that they are E85 vehicles, they will then exchange or broadcast messages to each other concerning the information about the E85 gas stations 34 that they have stored. The E85 vehicles 36 and 38 do not initially exchange their full information concerning the E85 gas stations 34, such as shown in Table 1, because the wireless channel might otherwise be overloaded, but exchange an abstract or index of the information, such as shown in Table 2, that includes the E85 station ID number and the time stamp of when the particular information from that particular station was generated. The E85 gas station ID number can be a hash function of the longitude and latitude of the E85 gas station 34. Each vehicle 36 and 38 then compares its own index list with the received E85 station index list to identify which ones are the same and which ones are different, but also which ones are newer and which ones are staler.

TABLE 2

| E85 Station ID #1 | Time Stamp |
|---|---|
| E85 Station ID #2 | Time Stamp |
| E85 Station ID #3 | Time Stamp |
| E85 Station ID #n | Time Stamp |

Table 3 is an example of an E85 gas station index list that may be sent from the E85 vehicle 36 to be received by the E85 vehicle 38 and table 4 is an example of an E85 gas station index list that may be sent from the E85 vehicle 38 to the E85 vehicle 36. For those E85 gas stations that the transmitting vehicle has that the receiving does not, the transmitting vehicle will then send the complete E85 gas station information to the receiving vehicle so that it can update its E85 gas station list. Also, for those common E85 gas stations in the lists of the two vehicles 36 and 38, the vehicle with the fresher or more current information about a particular E85 gas station will be sent to the other E85 vehicle.

In the example for tables 3 and 4, the E85 vehicle 36 will request that the E85 vehicle 38 send the full E85 gas station information for E85 station numbers 87 and 826 because the E85 vehicle 36 does not have a record of those stations. Further, the E85 vehicle 36 will request that the second E85 vehicle send the full E85 gas station information for station number 713 because the information that the E85 vehicle 38 has is more current that the information that the E85 vehicle 36 has. Likewise, the E85 vehicle 38 will request that the E85 vehicle 36 send the complete E85 gas station information for E85 station number 109 because the E85 vehicle 38 does not have a record of that E85 station in its list. Further, the E85 vehicle 38 will request that the E85 vehicle 36 send the complete information for E85 station number 629 because the information that the E85 vehicle 36 has about that station is more current. Thus, after the E85 vehicles 36 and 38 pass each other, their E85 station lists are updated to be more current and to include the information of the stations that the other vehicle had that the one vehicle did not, where the two E85 gas station lists stored on the two vehicles 36 and 38 should be the same.

TABLE 3

| E85 Station #109 | May 12, 2008 |
|---|---|
| E85 Station #210 | May 09, 2008 |
| E85 Station #421 | May 10, 2008 |
| E85 Station #629 | May 16, 2008 |
| E85 Station #713 | May 14, 2008 |

TABLE 4

| E85 Station #87 | May 12, 2008 |
|---|---|
| E85 Station #210 | May 09, 2008 |
| E85 Station #421 | May 10, 2008 |
| E85 Station #629 | May 13, 2008 |
| E85 Station #713 | May 15, 2008 |
| E85 Station #826 | May 14, 2008 |

When the user requests the display of the E85 gas stations on the display 20, it may not be convenient to display all of the E85 gas stations it has in its database, but only a certain number of the closest E85 gas stations to the vehicle's location. Further, the E85 location system can be combined with the vehicle's navigation system to provide route guidance to a selected station, and possibly provide automatic pump reservations.

Although the specific embodiment discussed above has to do with exchanging information about E85 gas stations, it is stressed that the present invention has application for any specialty type service establishment related to vehicles, such as hydrogen refueling stations for fuel cell vehicles, electric charging stations for electric vehicles, etc.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for exchanging information concerning E85 gas stations between E85 vehicles, said method comprising:
   broadcasting messages from an E85 gas station that include a location of the E85 gas station, a time of the broadcast and a price of the E85 gas;
   receiving and storing the messages on E85 vehicles that pass within a defined distance of the E85 gas station;
   identifying two vehicles as E85 vehicles that pass relative to each other; and
   exchanging information between the two E85 vehicles concerning the E85 gas stations stored on the two vehicles so that a first vehicle receives and stores information about E85 gas stations from a second vehicle and the second vehicle receives and stores information about E85 gas stations from the first vehicle, wherein exchanging information between the two vehicles concerning the E85 gas stations includes exchanging an index list of the E85 gas stations stored on the first and second vehicles that includes a station ID number and a time stamp of when information about the E85 gas station was generated.

2. The method according to claim 1 wherein exchanging information between the two E85 vehicles concerning the E85 gas stations includes identifying which E85 gas stations in the index list received by the first or the second vehicle are not currently stored by that vehicle, and then requesting that the other first or second vehicle send information about the E85 gas station for the stations that the first or second vehicle does not have.

3. The method according to claim 2 wherein the information includes gas station ID number, gas station location, time stamp, and gas price.

4. The method according to claim 1 wherein exchanging information between the two E85 vehicles concerning the E85 gas stations includes exchanging information about the E85 gas stations for those E85 gas stations that the first or second vehicle has stored.

5. The method according to claim 1 wherein storing the messages on the E85 vehicle includes storing information concerning the E85 gas stations ID number, its location, a time stamp when the information was generated and the current price of the E85 gas of that E85 gas station.

6. The method according to claim 5 wherein storing the messages on the E85 vehicles also include storing a coupon that provides value for purchasing gas at the E85 gas station.

7. The method according to claim 1 wherein broadcasting messages from an E85 gas station includes using a short range communication transmitter.

8. The method according to claim 1 wherein the certain distance is less than 5 kilometers.

9. The method according to claim 1 wherein identifying two vehicles as E85 vehicles includes periodically transmitting a beacon from a vehicle identifying the vehicle as an E85 vehicle and receiving the beacon by another E85 vehicle.

10. A method for exchanging information concerning E85 gas stations between E85 vehicles, said method comprising:
    broadcasting messages from an E85 gas station that include a location of the E85 gas station, a time of the broadcast and a price of the E85 gas;
    receiving and storing the messages on E85 vehicles that pass within a defined distance of the E85 gas station;
    identifying two vehicles as E85 vehicles that pass relative to each other; and
    exchanging information between the two E85 vehicles concerning the E85 gas stations stored on the two vehicles so that one of the vehicles receives and stores information about E85 gas stations from the other vehicle and the other vehicle receives and stores information about E85 gas stations from the one vehicle, wherein exchanging information between the two vehicles includes first exchanging an index list of the E85 gas stations stored on the two E85 vehicles that only includes a station ID number and a time stamp of when the vehicle received the information about the E85 gas station, identifying E85 gas station information that each of the two vehicles do not have that are on the other vehicles index list, identifying the E85 gas station ID numbers that are common between the two vehicles, and requesting that the vehicles transmit a list of information concerning the E85 gas stations that one vehicle has but the other does not have and one vehicle has a more current time stamp for where the information includes the E85 gas station ID number, its location, a time stamp when the information is received and the current price of the E85 gas at that time.

11. The method according to claim 10 wherein storing the messages on the E85 vehicles also include storing a coupon that provides value for purchasing gas at the E85 gas station.

12. The method according to claim 10 wherein broadcasting messages from an E85 gas station includes using a short range communication transmitter.

13. The method according to claim 10 wherein identifying two vehicles as E85 vehicles includes periodically transmitting a beacon from a vehicle identifying the vehicle as an E85 vehicle and receiving the beacon by another E85 vehicle.

14. A system for exchanging information concerning E85 gas stations between E85 vehicles, said system comprising:
    means for broadcasting messages from an E85 gas station that include a location of the E85 gas station, a time of the broadcast and a price of the E85 gas;
    means for receiving and storing the messages on E85 vehicles that pass within a defined distance of the E85 gas station;
    means for identifying two vehicles to each other as E85 vehicles that pass relative to each other; and
    means for exchanging information between the two vehicles concerning the E85 gas stations stored on the two vehicles where one of the vehicles receives and stores information about E85 gas stations from the other vehicle that it does not have and the other vehicle receives and stores information about E85 gas stations from the one vehicle that it does not have, wherein the means for exchanging information between the two vehicles concerning the E85 gas stations exchanges an index list of the E85 gas stations stored on the vehicles that includes a station ID number and a time stamp of when information about the E85 gas station was generated.

15. The system according to claim 14 wherein the means for exchanging information between the two E85 vehicles concerning the E85 gas stations includes identifying which E85 gas stations in the index list received by the one or other vehicle are not currently stored by that vehicle, and then requesting that the one or other vehicle send information about the E85 gas station for the stations that the one or other vehicle does not have.

16. The system according to claim 14 wherein the means for exchanging information between the two E85 vehicles concerning the E85 gas stations exchanges complete information about the E85 gas stations for those E85 gas stations that the one or other vehicle has stored.

17. The system according to claim 14 wherein the means for storing the messages on the E85 vehicle stores information concerning the E85 gas stations ID number, its location, a time stamp when the information was generated and the current price of the E85 gas.

18. The system according to claim 17 wherein the means for storing the messages on the E85 vehicles also stores a coupon that provides value for purchasing gas at the E85 gas station.

19. A method for exchanging information concerning E85 gas stations between E85 vehicles, said method comprising:
    broadcasting messages from an E85 gas station that include a location of the E85 gas station, a time of the broadcast and a price of the E85 gas;
    receiving and storing the messages on E85 vehicles that pass within a defined distance of the E85 gas station, wherein storing the messages on the E85 vehicle includes storing information concerning the E85 gas stations ID number, its location, a time stamp when the information was generated and the current price of the E85 gas of that E85 gas station;
    identifying two vehicles as E85 vehicles that pass relative to each other; and
    exchanging information between the two E85 vehicles concerning the E85 gas stations stored on the two vehicles so that a first vehicle receives and stores information about E85 gas stations from a second vehicle and the second vehicle receives and stores information about E85 gas stations from the first vehicle.

20. A system for exchanging information concerning E85 gas stations between E85 vehicles, said system comprising:
    means for broadcasting messages from an E85 gas station that include a location of the E85 gas station, a time of the broadcast and a price of the E85 gas;
    means for receiving and storing the messages on E85 vehicles that pass within a defined distance of the E85 gas station, wherein the means for storing the messages on the E85 vehicle stores information concerning the E85 gas stations ID number, its location, a time stamp when the information was generated and the current price of the E85 gas;
    means for identifying two vehicles to each other as E85 vehicles that pass relative to each other; and
    means for exchanging information between the two vehicles concerning the E85 gas stations stored on the two vehicles where one of the vehicles receives and stores information about E85 gas stations from the other vehicle that it does not have and the other vehicle receives and stores information about E85 gas stations from the one vehicle that it does not have.

* * * * *